E. H. SCHRIEFER.
FIRE RESISTING CABINET.
APPLICATION FILED MAY 29, 1913. RENEWED JULY 9, 1918.
1,294,838.
Patented Feb. 18, 1919.
5 SHEETS—SHEET 5.
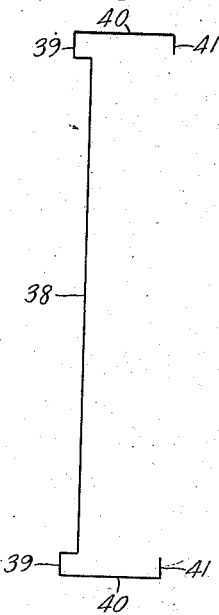
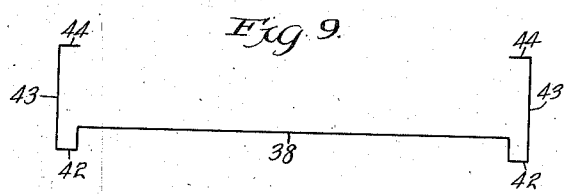
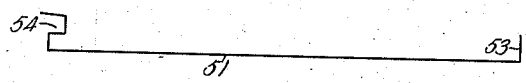
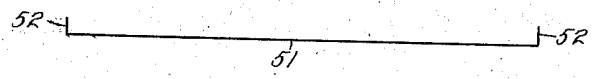
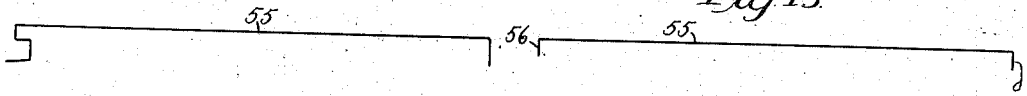
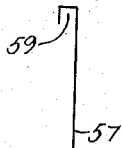
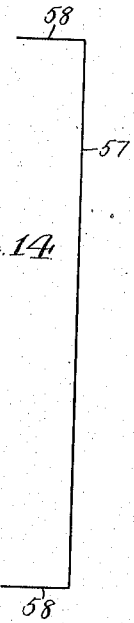
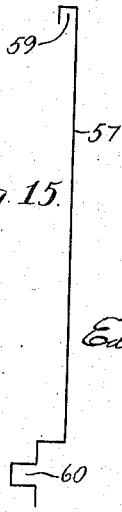
WITNESSES
INVENTOR
Edward H. Schriefer
BY
ATTORNEY

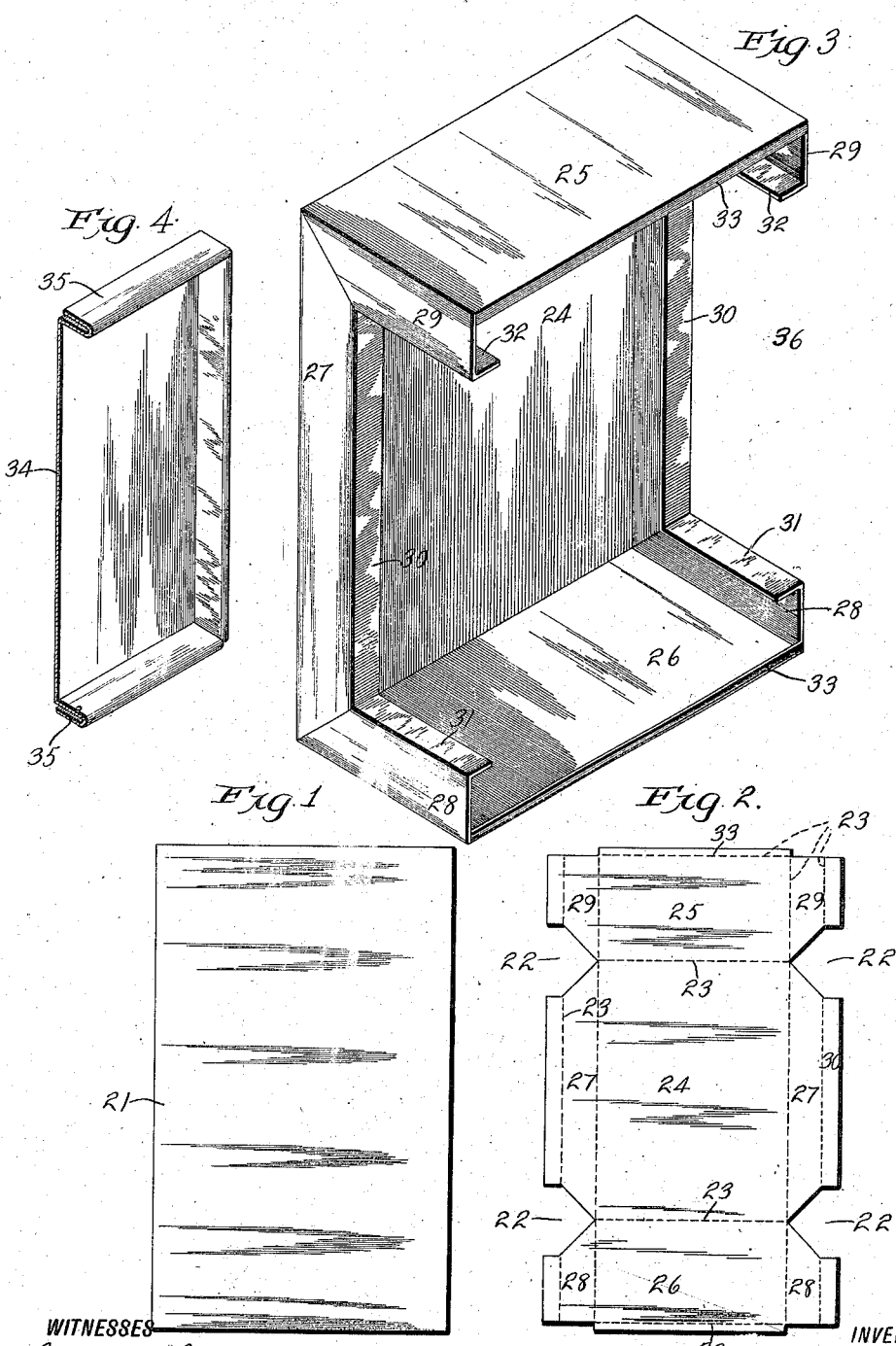

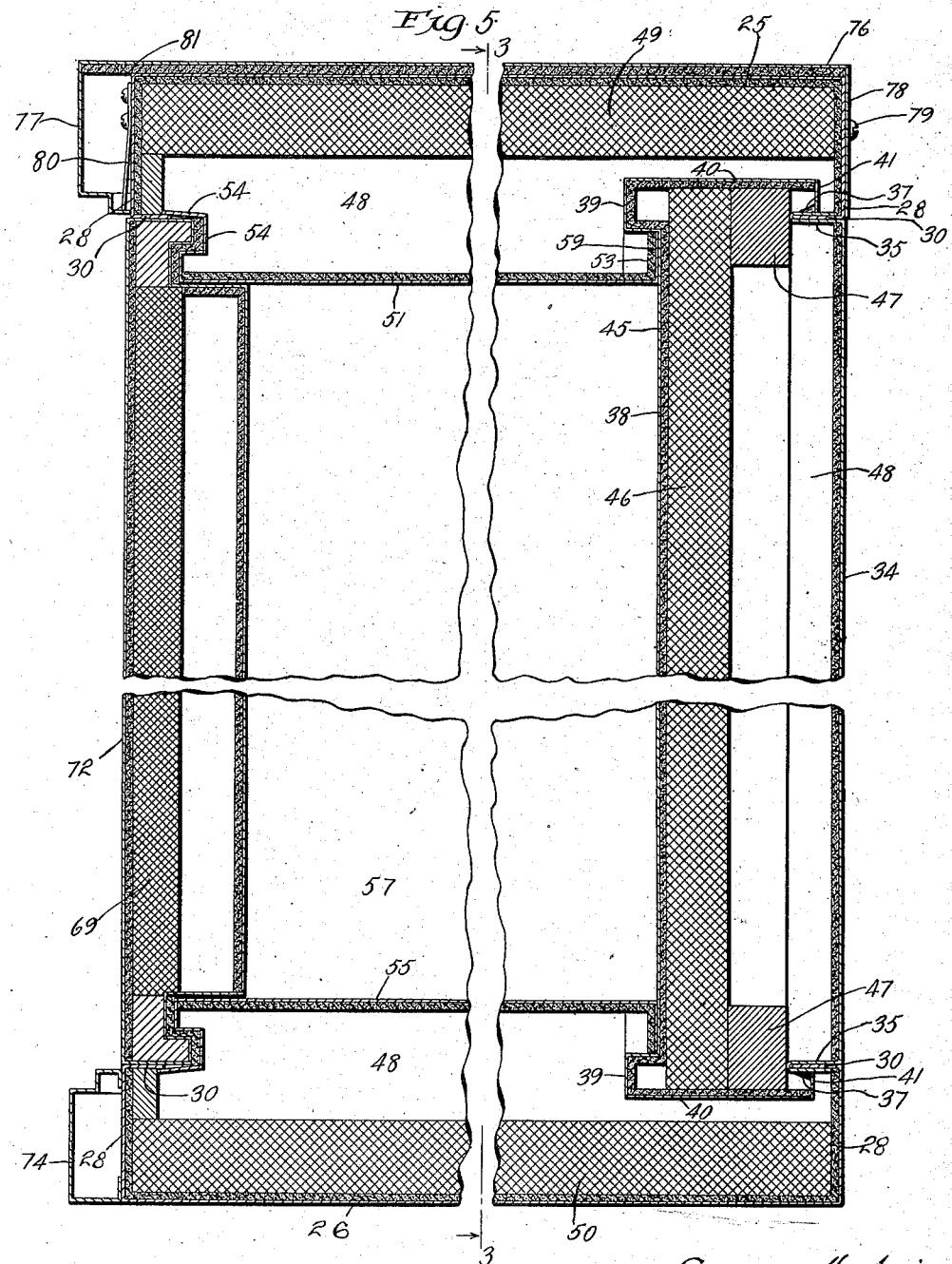

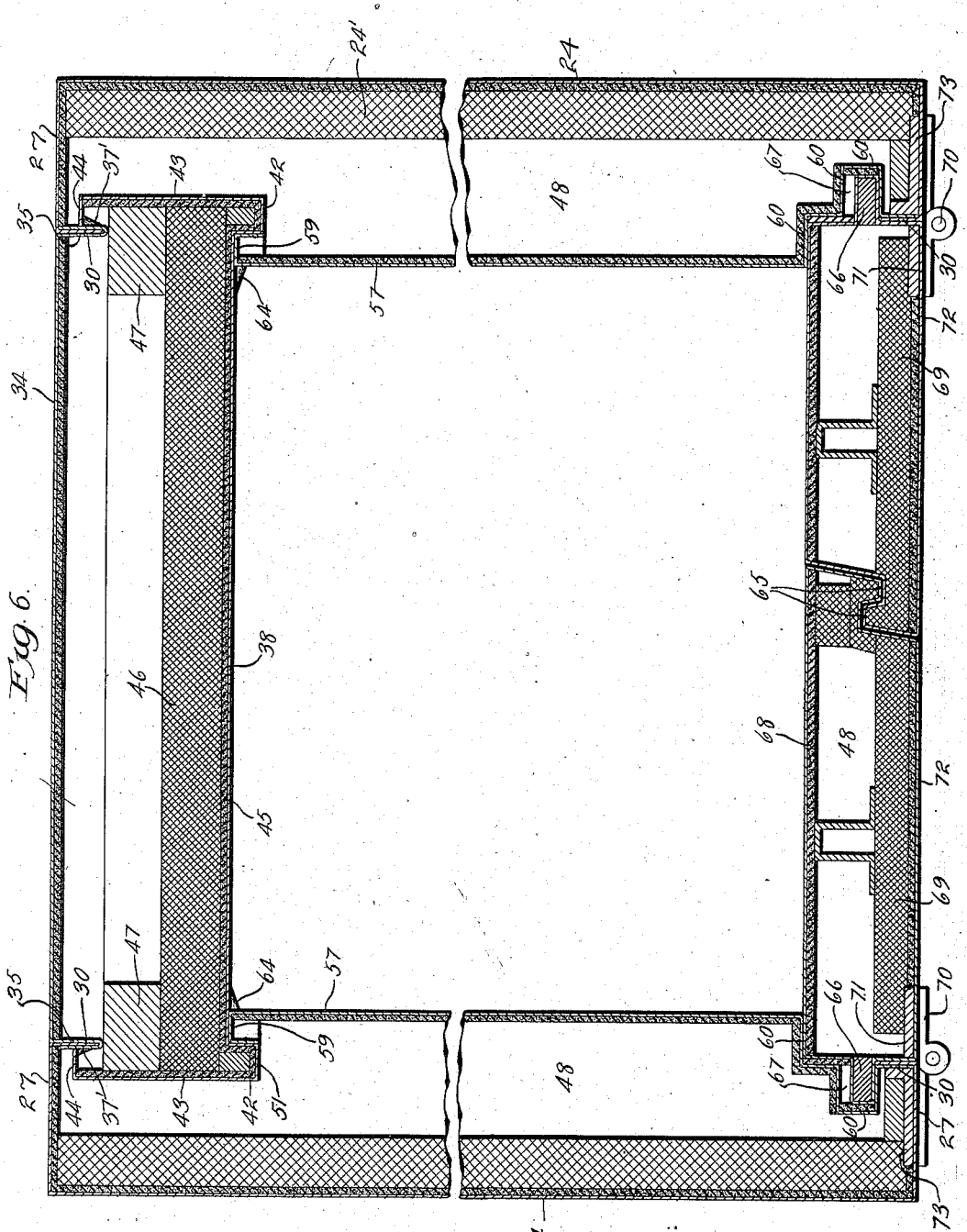

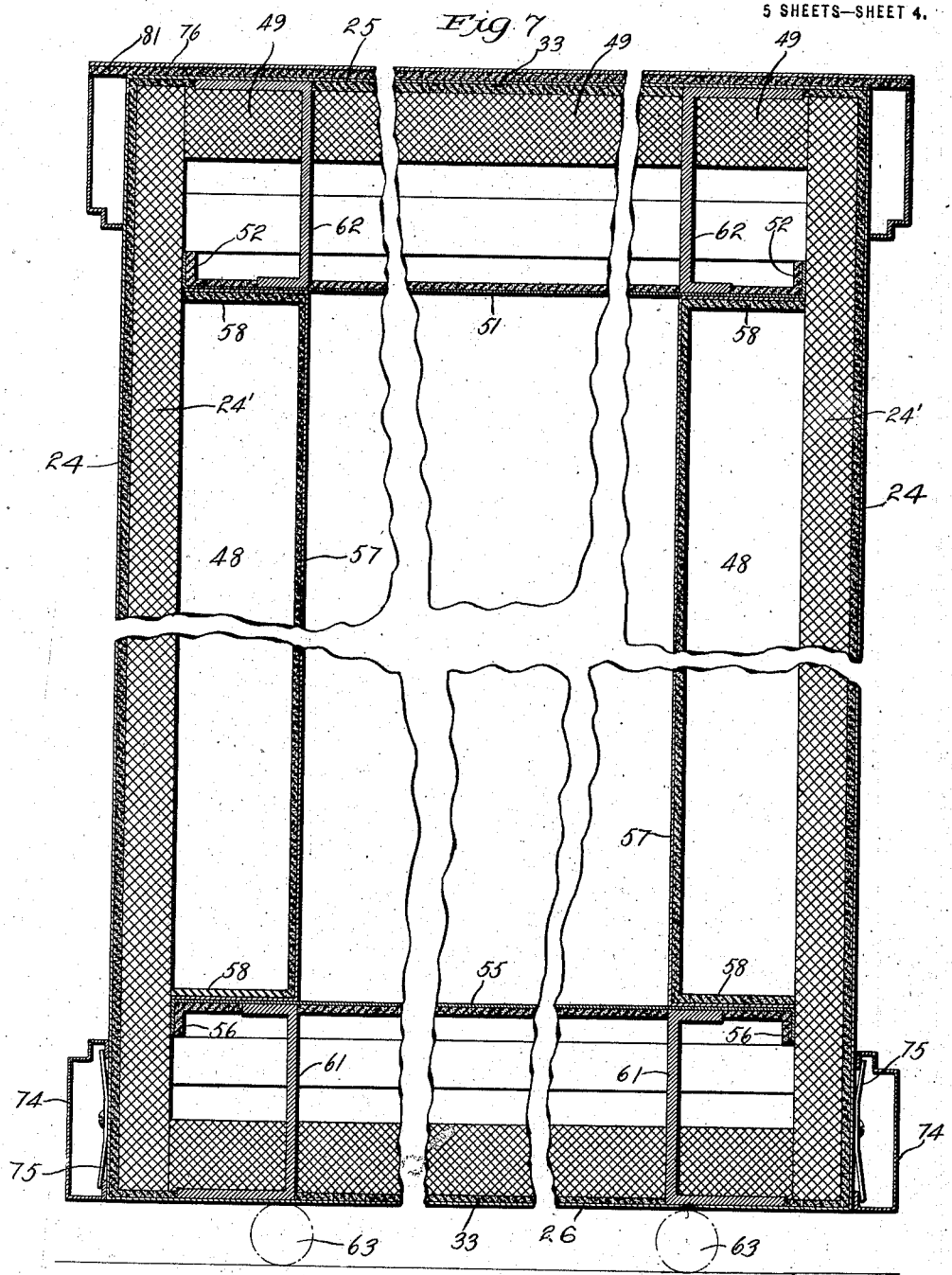

UNITED STATES PATENT OFFICE.

EDWARD H. SCHRIEFER, OF CINCINNATI, OHIO, ASSIGNOR TO THE SAFE-CABINET CO., OF MARIETTA, OHIO, A CORPORATION OF OHIO.

FIRE-RESISTING CABINET.

1,294,838.  Specification of Letters Patent.  Patented Feb. 18, 1919.

Application filed May 29, 1913, Serial No. 770,558. Renewed July 9, 1918. Serial No. 244,122.

*To all whom it may concern:*

Be it known that I, EDWARD H. SCHRIEFER, a citizen of the United States, and a resident of Cincinnati, Hamilton county, Ohio, have invented a new and useful Fire-Resisting Cabinet, of which the following is a specification.

My invention relates to improvements in fire resisting cabinets and has for its principal object the provision of a device of simple and economical construction possessing rigidity and strength when assembled, and features enabling it to withstand very high temperatures without resultant loss to its contents or serious damage to itself.

I am aware of various previous patents which have been granted on devices of this nature, but my structure has many advantages over the previous forms as will be seen from the specification and drawings herewith, in which—

Figure 1 is a reduced view of the blank used in making the member illustrated in Fig. 3.

Fig. 2 is a view of the blank shown in Fig. 1 after it has been notched at the corners, the dotted lines showing where the bends are to be made.

Fig. 3 is a perspective of one element of the main frame.

Fig. 4 is a perspective of a portion of the outer back wall.

Fig. 5 is a vertical section from the front to the back of the structure.

Fig. 6 is a horizontal section.

Fig. 7 is a vertical section from side to side of the structure on the line 3—3 of Fig. 5.

Fig. 8 is a diagrammatic view of the inner back member showing the outline of the same in vertical cross section.

Fig. 9 is a diagrammatic view of the inner back member, showing the outline of the same in horizontal cross section.

Fig. 10 is a diagrammatic view of the inner top member, showing the outline of the same in vertical cross section from the front to the back of the structure.

Fig. 11 is a diagrammatic view of the inner top member, showing the outline of the same in vertical cross section from side to side of the structure.

Fig. 12 is a diagrammatic view of the inner bottom member, showing the outline of the same in vertical cross section from the front to the back of the structure.

Fig. 13 is a diagrammatic view of the inner bottom member, showing the outline of the same in vertical cross section from side to side of the structure.

Fig. 14 is a diagrammatic view of the inner side members, showing the outline of the same in vertical cross section.

Fig. 15 is a diagrammatic view of the inner side members, showing the outline of the same in horizontal cross section.

In constructing my device a sheet of metal 21 as shown in Fig. 1, is notched as at 22 and then bent along the dotted lines 23, as shown in Fig. 2, to form the structure shown in Fig. 3, the parts 24, 25 and 26, constituting respectively the outer side or end wall, the outer top wall and the outer bottom wall of the cabinet. Rectangular flanges 27, 28 and 29 are formed by the bends on the dotted lines, and secondary flanges 30, 31 and 32 at right angles to the flanges 27, 28 and 29 are formed by additional bendings.

It is obvious that two structures as shown in Fig. 3 can be placed together with the flanges 33 in juxtaposition, and the said flanges 33 can then be welded together to form practically a hollow cube with closed top, bottom and sides and open back and front with inwardly extending flanges 30, 31 and 32. This structure can be made of one sheet of metal if preferred, but as shown herein is made of two sections, but after they are welded, it is practically integral and possesses great strength and rigidity.

The outer back wall, as shown in Fig. 4, is formed of one piece of sheet metal and comprises the rear plate 34 with peripheral U shaped flanges 35. After this member is formed it can be inserted through the opening 36 in the front of the elemental frame just described and moved rearwardly until the flanges 30 on the back of the frame enter the U shaped flanges 35 of the outer back wall. These three thicknesses of metal can then be locked together in any suitable manner, but preferably by using a punch to cut loose in the three sheets, two sides and one end of a small rectangular portion of the said sheets, the loose ends of the said rectangular portions being projected as shown at 37 in Fig. 5, and 37' in Fig. 6. A number of these projections may be made along the line of engagement of the flanges 30 and the U shaped flanges 35 on the outer back wall.

In this manner we obtain a very rigid and secure locking together of the elemental frame and the outer back wall and obviate the danger of buckling or warping if the back of the cabinet should be subjected to very intense heat.

The inner back wall as shown in Figs. 5 and 6, comprises a wall member 38 with compound flanges 39, 40 and 41 on its upper and lower ends and the compound flanges 42, 43, and 44 on its sides. A light sheet of suitable insulating material 45 and a heavier sheet of the same 46, are placed upon one side of this member and blocks 47 of similar material are located opposite the joints formed by the flanges 30 on the outer frame and the flanges 35 on the outer back member 34.

The flanges 41 and 44 setting in behind the projections 37 and 37' serve to hold this inner back wall securely in position. Heavy sheets of insulating material 49 and 50 are shown respectively at the top and bottom of the structure and a dead air space 48 is provided between the inner and outer walls of the structure.

The inner top wall 51 consists of a sheet of metal provided on its sides with flanges 52, which engage with the insulating material 24' on the outer side walls 24. A flange 53, and compound flanges 54 are provided respectively at the rear and front ends.

The inner bottom wall 55 is similar in construction to the inner top wall 51 and is held in pace in like fashion, the side flanges 56 engaging with the insulating material 24' on the outer side walls 24 and the front and rear end flanges being identical with those on the member 51.

The inner side walls 57 consist of metal sheets provided with top and bottom flanges 58 adapted to engage with the insulating material 24' on the outer side walls 24, double flanges 59 at the rear ends and compound flanges 60 at the front ends. These inner side walls are placed in the structure after the other walls are assembled and are held in position by the projections 64 on the inner back member.

Shelves are used in constructions of this nature on which books, papers, rollers, files, drawers, etc., etc., are supported and these shelves are usually secured to the inner side walls 57. To prevent this heavy weight from buckling or breaking down these inner walls, channel irons 61 and 62 are placed respectively beneath and above the line of the said walls between the inner and outer walls of the cabinet, and casters 63 are also shown directly under this line of greatest resistance. The upper channel irons 62 are of particular service during shipment of the cabinets, as, when boxed or crated, the said cabinets are frequently turned upside down and if a heavy equipment of shelves, files, etc., were installed in the interior, there would exist a liability of the inner top wall of the structure being injured.

The doors of the cabinet as shown have interlocking projections 65 at their abutting joints, and tongues 66 to coöperate with the recesses 67 in the inner wall members and thereby make an efficient heat resisting joint. The doors are lined with a sheet of insulating material 68 and have a heavier insulating material 69 on their inner front sides. Hinges 70 are secured to the doors in a suitable manner through the reinforcement 71 inside the outer sheet 72 of the door, and are suitably secured to the main structure through the reinforcement 73 inside the outer sheet of the said main structure.

Surrounding the cabinet on three sides is the base molding 74, secured by the clamps 75, and a crown plate 76 provided with a coping 77 and a straight flange 78 at the rear, secured to the cabinet by the screws 79, and in the front by a resilient member 80. A sheet of insulating material 81 is placed between the top of the elementary structure and the said crown plate 76.

I claim:

1. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member provided with U-shaped flanges adapted to engage with said secondary flanges of said frame.

2. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member provided with U-shaped flanges adapted to engage with said secondary flanges of said frame, and means for securing said secondary frame flanges and said U-shaped flanges together.

3. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member and an inner back member the main part of which is spaced inward from said outer back member and which is provided with flanges bending forward at right angles to the main plane, then outwardly parallel to said plane, then backward again at right angles to said plane and then inward again parallel to said plane, and means for securing together said frame, outer back member and inner back member.

4. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member and means adapted to secure same in position in said frame, and an inner back member the main part of which is spaced inward from said outer back member and which is provided with flanges bending forward at right angles to the main plane, then outwardly parallel to said plane, then backward again at right angles to said plane and then inward again parallel to said plane, the last mentioned bends of said flanges being adapted to engage with the flanges on said outer back member.

5. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member and means adapted to secure same in position in said frame, and an inner back member the main part of which is spaced inward from said outer back member and which is provided with flanges bending forward at right angles to the main plane, then outwardly parallel to said plane, then backward again at right angles to said plane and then inward again parallel to said plane, the last mentioned bends of said flanges being adapted to engage with the co-acting flanges on said outer back member and the U-shaped flanges of said outer back member.

6. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member and means adapted to secure same in position in said frame, and an inner back member the main part of which is spaced inward from said outer back member and which is provided with flanges bending forward at right angles to the main plane, then outwardly parallel to said plane, then backward again at right angles to said plane.

7. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member, an inner back member, and inner side members spaced inward from said outer wall members respectively, provided at their forward edges with flanges bending outward at right angles to the main plane of such members, then forward parallel to said main plane, then outward again at right angles to said plane, then forward again parallel with said plane, then inward again at right angles to said plane, then outward again parallel to said plane, and means for securing together said frame, outer back member and inner back member.

8. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member, an inner back member, and inner side members spaced inward from said outer wall members respectively, provided at their forward edges with flanges bending outward at right angles to the main plane of such members, then forward parallel to said main plane, then outward again at right angles to said plane, then forward again parallel with said plane, then inward again at right angles to said plane, then outward again parallel to said plane, means on said inner back member adapted to hold the rear edges of said inner wall members in position, and means for securing together said frame, outer back member and inner back member.

9. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member, an inner back member, and inner side members spaced inward from said outer wall members respectively, provided at their forward edges with flanges bending outward at right angles to the main plane of such members, then forward parallel to said main plane, then outward again at right angles to said plane, then forward again parallel with said plane, then inward again at right angles to said plane, then outward again parallel to said plane, the flanges on said forward edges being adapted to interlock with the secondary flanges on said frame, and means for securing together said frame, outer back member and inner back member.

10. In a device of the character described, the combination with a frame having a plurality of sides, each of which forms one of the outer walls of the structure, provided with flanges projecting inwardly at right angles and with secondary flanges projecting inwardly at right angles with said first named flanges; of an outer back member having U-shaped flanges engaging said secondary flanges, an inner back member having compound flanges secured to said U-shaped flanges, inner side wall members having flanges engaging the compound flanges of the inner back wall member and inner top and bottom members engaging said secondary flanges 11. In a device of the character described, the combination with a frame having a plurality of sides, each of which forms one of the outer walls of the structure, provided with flanges projecting inwardly at right angles and with secondary flanges extending around the frame and projecting inwardly at right angles with said first named flanges; of an outer back member, an inner back member, inner side wall members, and an inner top member provided with flanges adapted to interlock with the secondary flanges on said frame.

12. In a device of the character described, the combination with a frame having a plurality of sides, each of which forms one of the outer walls of the structure, provided with flanges projecting inwardly at right angles and with secondary flanges extending around the frame and projecting inwardly at right angles with said first named flanges; of an outer back member, an inner back member, inner side wall members and an inner top wall member located above and resting upon the said inner back member and inner side wall members, and means adapted to hold said inner top member in position.

13. In a device of the character described, the combination with a frame having a plurality of sides, each of which forms one of the outer walls of the structure, provided with primary flanges projecting at right angles thereto and with secondary flanges projecting inwardly from and at right angles with said primary flanges; of a door member hinged at the front of the frame to one of said primary flanges and having one edge shutting against the secondary flange thereof.

14. In a device of the character described, the combination with a frame having a plurality of sides, each of which forms one of the outer walls of the structure, provided with primary flanges projecting at right angles thereto and with secondary flanges projecting inwardly from and at right angles to said primary flanges; of a swinging member comprising an outer door member, an inner door member, means for securing said outer and inner members together, and means for pivotally securing said swinging member at the front of said frame to one of said primary flanges thereof, said swinging member having one edge shutting against the secondary flange thereof.

15. In a device of the character described, the combination with a frame having a plurality of sides, each of which forms one of the outer walls of the structure, provided with primary flanges projecting at right angles thereto and with secondary flanges extending around the frame and projecting inwardly from and at right angles with said primary flanges; of an inner side wall member provided with a flange at its forward end bent so as to form a vertical recess therein, and a swinging door comprising an outer door member, an inner door member, said inner door member being provided with a flange adapted when said door is swung shut to engage with the recess in the flange of said inner wall member, and means for pivotally securing said door to the primary flange of the vertical wall of said frame.

16. In a device of the character described, the combination with a frame having a plurality of sides, each of which forms one of the outer walls of the structure, provided with primary flanges projecting at right angles thereto and with secondary flanges extending around said frame and projecting inwardly from and at right angles with said primary flanges; of inner side wall members provided with flanges at their forward ends bent so as to form vertical recesses therein, and a plurality of swinging doors, each of which is hinged at the front of the frame to one of said primary flanges and each of which comprises an outer door member and an inner door member and means for securing said inner and outer members together; said inner door members being provided at their outer edges with flanges adapted to engage when the door is shut with the recesses in said secondary flanges, and said inner door members being provided at their inner or contiguous edges with interlocking flanges adapted to engage with each other respectively.

17. In a device of the character described, the combination with a frame having a plurality of sides, each of which forms one of the outer walls of the structure, provided with primary flanges projecting at right angles thereto and with secondary flanges extending around the frame and projecting inwardly at right angles to said primary flanges; of an inner side wall member provided with a flange at its forward end bent so as to form a vertical recess therein, said recess having insulating material, and a swinging door hinged at the front of the frame to one of said primary flanges and having a tongue shutting into said recess.

EDWARD H. SCHRIEFER.

Witnesses:
JOHN M. HAMMOND,
DOROTHY KLIME.